United States Patent [19]
Peel

[11] Patent Number: 5,971,558
[45] Date of Patent: Oct. 26, 1999

[54] METHOD AND APPARATUS FOR MOUNTING AN INSTRUMENT

[75] Inventor: Ronald Brian Peel, North Muskegon, Mich.

[73] Assignee: Kuhlman Corporation, Spring Lake, Mich.

[21] Appl. No.: 08/656,959

[22] Filed: Jun. 6, 1996

[51] Int. Cl.$^6$ .............................. G01D 11/28; F21V 7/04
[52] U.S. Cl. ................. 362/26; 362/23; 362/31; 362/32
[58] Field of Search ................ 362/23, 26, 158, 362/31, 32

[56] References Cited

U.S. PATENT DOCUMENTS

| | | | |
|---|---|---|---|
| 2,916,606 | 12/1959 | Laufer et al. | 362/23 |
| 3,108,477 | 10/1963 | Porter . | |
| 3,126,738 | 3/1964 | Taylor | 73/182 |
| 3,143,885 | 8/1964 | Waite et al. . | |
| 3,147,623 | 9/1964 | Johnson et al. . | |
| 3,152,480 | 10/1964 | Hoff, Jr. . | |
| 3,166,941 | 1/1965 | Waite et al. . | |
| 3,205,712 | 9/1965 | Hoff, Jr. . | |
| 3,527,102 | 9/1970 | Harland . | |
| 3,537,322 | 11/1970 | Waite et al. . | |
| 3,543,586 | 12/1970 | Waite . | |
| 3,599,910 | 8/1971 | Wipff | 362/23 |
| 3,603,779 | 9/1971 | Horme . | |
| 3,803,918 | 4/1974 | Blough, Jr. . | |
| 4,004,546 | 1/1977 | Harland . | |
| 4,175,444 | 11/1979 | Harland . | |
| 4,380,043 | 4/1983 | Takamatsu et al. | 362/26 |
| 4,559,582 | 12/1985 | Scardilli et al. | 362/26 |
| 4,872,093 | 10/1989 | Shimizu | 362/26 |
| 5,142,456 | 8/1992 | Murphy | 362/26 |
| 5,381,309 | 1/1995 | Bochardt | 362/26 |
| 5,432,497 | 7/1995 | Briski et al. | 340/525 |
| 5,458,082 | 10/1995 | Cookingham | 362/26 |
| 5,531,181 | 7/1996 | Cookingham | 362/26 |
| 5,546,888 | 8/1996 | Skiver et al. | 362/26 |
| 5,678,912 | 10/1997 | Ayres et al. | 362/23 |
| 5,703,612 | 12/1997 | Salmon et al. | 362/26 |

OTHER PUBLICATIONS

Ametek/Dixson, Instrumentation Catalog, pp. 14–15.

*Primary Examiner*—Stephen Husar
*Assistant Examiner*—Matthew J. Spark
*Attorney, Agent, or Firm*—Dykema Gossett PLLC

[57] ABSTRACT

An evenly-lit instrument assembly adapted to be front-mounted in an opening in a vehicle's dashboard is provided. The mounting of the instrument assembly is concealed. The instrument assembly includes a housing and a circuit assembly fitted inside the housing. The circuit assembly controls a pointer. A dial is located above the circuit assembly, and is secured inside of the housing. A light pipe is further included inside the housing and positioned just above the circuit assembly for evenly disbursing light provided by a light-emitting source across the dial.

16 Claims, 5 Drawing Sheets

METHOD AND APPARATUS FOR MOUNTING AN INSTRUMENT

FIELD OF THE INVENTION

The present invention relates generally to vehicle instruments and gauges, and more particularly, to an evenly-lit instrument assembly and method for mounting said assembly to the front of a vehicle's dashboard.

BACKGROUND OF THE INVENTION

Instruments have long been used in the transportation industry for providing information to the operator about the status of a vehicle's internal systems. Instruments which measure characteristics such as the amount of fuel in the fuel tank, the number of revolutions per minute of the engine, or the number of miles per hour being traveled are all very commonly used on a variety of vehicles, including boats, cars, trucks, and even construction equipment.

The number of instruments per vehicle varies considerably. The typical vehicle generally includes four instruments, but many vehicles include more. For example, boats and heavy-duty trucks often require as many as ten instruments, owing to the number of engines per vehicle and the variety of information which is of interest to the operator. Whatever their number, each of these instruments must be firmly mounted to the surface of the dashboard to minimize vibration relative to the operator such that the instrument's dial face may be easily read. Traditionally, this mounting has been accomplished by means of a collection of metal brackets which are mounted behind the vehicle's dashboard and which attach to the back of each of the instruments by means of screw terminals and threaded nuts. This method hides the instrument mounting from the operator, which is highly desirable for purposes of aesthetics and instrument longevity. Instrument installation and removal, however, are extremely difficult, because the back of the dashboard is not readily accessible. In fact, it may take an experienced technician in excess of an hour to assemble a single dashboard having multiple instruments. Much of this time is due to the fact that the dashboard must be completely removed from the vehicle in order to access its back side and the mounting mechanisms for the instruments.

An additional consideration when mounting an instrument is the visibility of that instrument to the driver, especially at night. For this purpose, many instruments have some form of light source within themselves which provides light to the dial face. In order to achieve the desired brightness and even distribution of light across the instrument face, current instrument designs typically include incandescent bulbs as the light sources. However, incandescent bulbs burn out as a matter of course and must be replaced over the course of the instrument's life, making it necessary to periodically access the instrument for bulb replacement. This is undesirable not only because of the inconvenience of removing the "rear-mounted" instrument from the dashboard, but also because of the mere inconvenience of having to replace the burned-out bulb in the first place.

It would thus be desirable to have an instrument assembly which can be securely mounted to the front of the dashboard with a hidden mounting mechanism which is easily accessible. Furthermore, it is desirable to have a lighting mechanism in the instrument assembly which evenly distributes light across the face of the instrument and does not need replacement as a matter of course. The present invention is directed at achieving these objectives.

SUMMARY OF THE INVENTION

It is an objective of this invention to provide an easily accessible front-mounted instrument assembly for use in vehicles which requires minimal effort to assemble and install, and which includes a mechanism for visually concealing the front-mounting mechanism. The disclosed invention achieves this objective by providing a set of individual instrument components such as a circuit assembly, a dial graphic, a light pipe, and a crystal which fit together inside of an instrument housing, and which are aligned with each other by means of a keying system. The instrument housing is attached to the front side of a vehicle's dashboard by passing screws through a mounting flange on the instrument housing. The crystal is ultrasonically welded to the instrument housing to create a water-tight seal and hold the other components inside of the instrument housing. Finally, the screws are visually hidden by a bezel which snaps on to the instrument housing.

It is a further objective of this invention that the instrument have a mechanism for evenly lighting its face for easy viewing at night, and that this mechanism be relatively maintenance-free. The disclosed invention accomplishes this objective by providing a light pipe having a concave light pickup reflective surface which is positioned directly over an LED light source. In a preferred embodiment, the light pipe has a profile which is wedge-shaped and further has a light-receiving side which is substantially covered with pyramid-shaped prisms, the combination of which acts to evenly disburse light rays throughout the light pipe and illuminates the dial graphic located directly above the light pipe.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figures 1, 2:
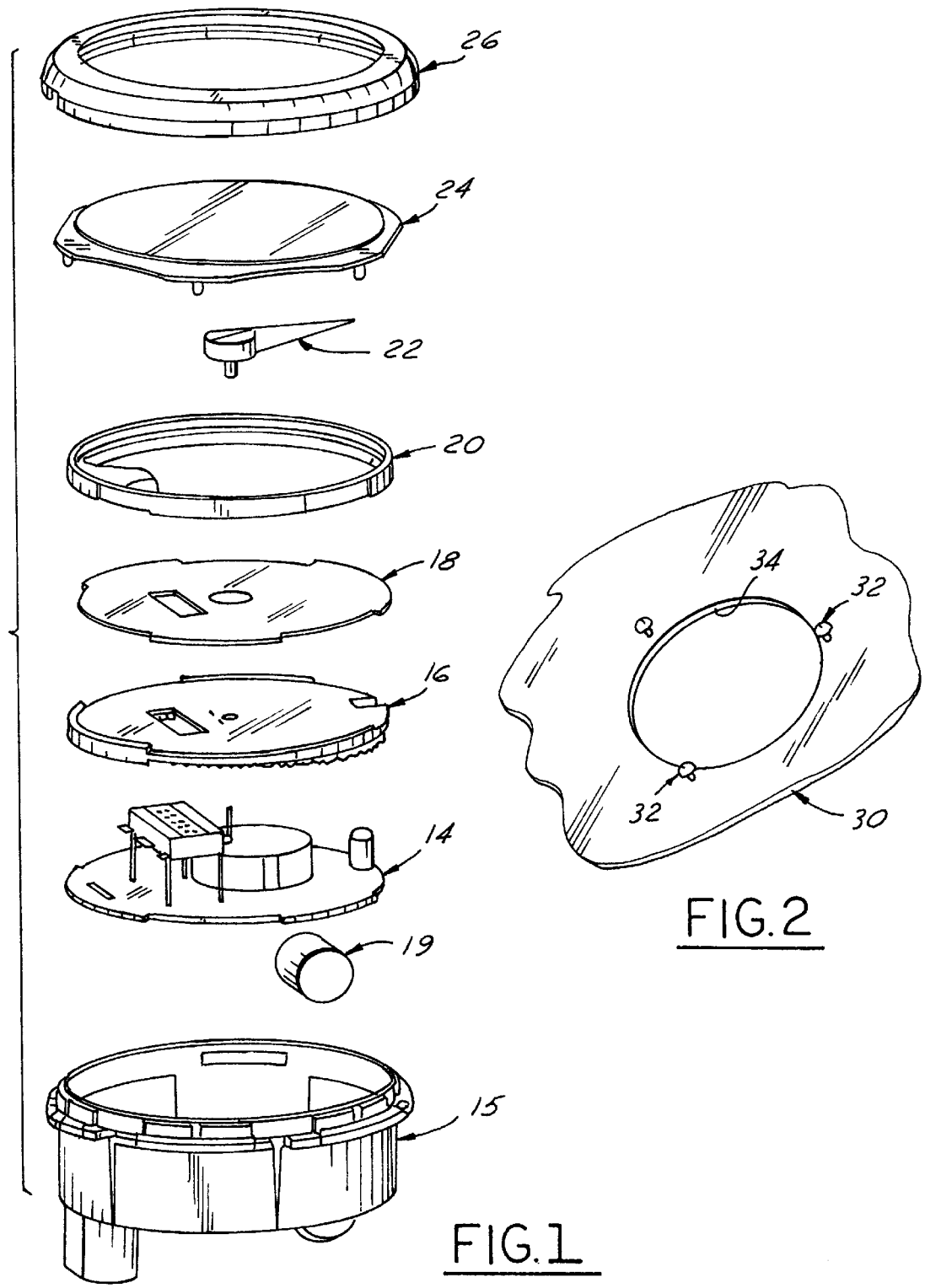
FIG. 1 is a simplified isometric view of an instrument assembly according to the present invention, showing an instrument housing, a dessicant cannister, a circuit assembly, a light pipe, a dial graphic, a mask, a pointer, a crystal, and a bezel.
FIG. 2 is a simplified isometric view of a portion of a representative dashboard in which the instrument assembly according to the present invention may be installed.

Referring to FIG. 1, an instrument assembly 17 includes a housing 15 which accommodates a desiccant canister 19 which prevents the instrument from fogging. A circuit assembly 14 fits snugly into housing 15 and receives a light pipe 16. A dial graphic 18 is adhered to light pipe 16. Both light pipe 16 and dial graphic 18 permit a pointer 22 to be mounted upon circuit assembly 14. A mask 20 is positioned on top of dial graphic 18. Crystal 24 is preferably ultrasonically welded to housing 15 to form a hermetic seal around housing 15. A bezel 26 is snapped onto housing 15 to hide the mounting mechanism and further secure the above-referenced elements inside housing 15. Note that while FIG. 1 shows a housing of approximately circular cross-section, the present invention is not limited to the circular shape and a variety of geometries could thus be selected.

FIG. 2 shows a dashboard 30 upon which instrument 17 would typically be mounted. Dashboard 30 has a hole 34 cut to fit the diameter of housing 15. Fasteners 32 are used to fasten instrument 17 securely to dashboard 30 such that instrument 17 does not rotate relative to dashboard 30. In the preferred embodiment, screws are used as fasteners 32, although one skilled in the art could foresee the use of many different types of fasteners. Bezel 26 snaps onto housing 15 to hide fasteners 32 and the edges of hole 34. Bezel 26 may also be used to secure crystal 24, mask 20, dial graphic 18, light pipe 16 and circuit assembly 14 inside of housing 15 in the event that crystal 24 is not ultrasonically welded to housing 15.

The preceding discussion demonstrates that the disclosed invention includes several components which easily fit together to form a single instrument assembly. The disclosed instrument assembly is installable into a dashboard without the need to access the back of the dashboard, which makes installation and removal much easier than if the instruments were mounted from the rear. In fact, a skilled technician, following the teachings of the present invention, can easily assemble multiple front-mounted instruments into a dashboard in a matter of minutes. The following discussion examines in detail the individual components of the disclosed assembly.

Figure 3:
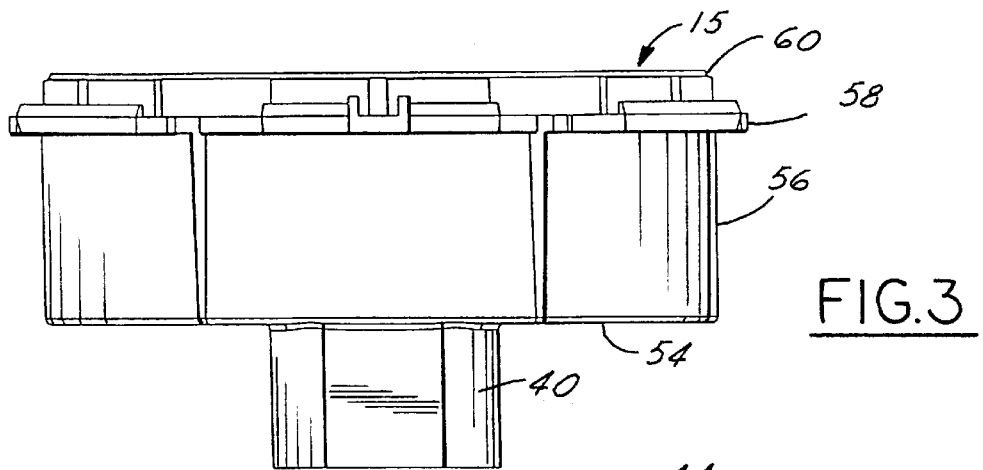
FIG. 3 is a simplified side view of the instrument housing.

Referring to FIG. 3, a side view of housing 15 details the shape thereof. Housing 15 is preferably molded of ABS plastic and includes connector port 40 extending from a ventral surface 54. Connector port 40 is adapted to receive an electrical connection from and communicate with a processing unit which provides data to instrument assembly 17. Lateral surface 56 is preferably rounded but is not limited to a round shape. A mounting flange 58 extends from lateral surface 56 and is pressed against dashboard 30 when instrument 17 is mounted. Housing 15 has a dorsal edge 60 against which crystal 24 is preferably ultrasonically welded.

Figure 4:
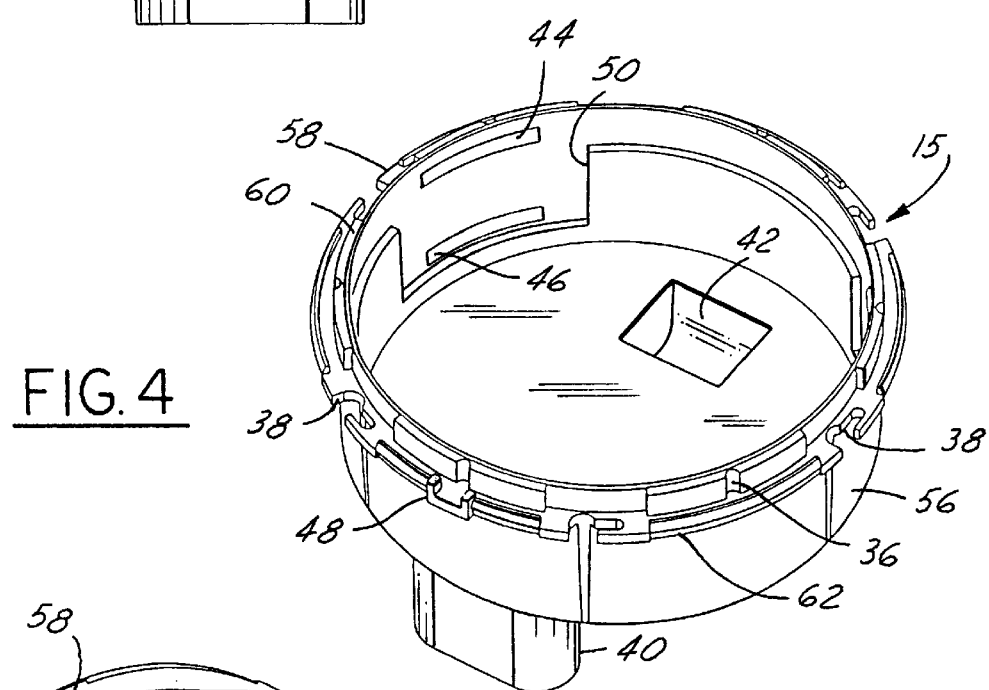
FIG. 4 is a simplified isometric view of the instrument housing.

In FIG. 4, housing 15 is viewed from a top and side angle to reveal preferable features thereof. In general, features serve either to facilitate the spacing, alignment and assembly of the internal components of instrument 17 or to facilitate the external front-mounting thereof. With respect to the internal support features, dorsal edge 60 includes one or more crystal locating dimples 36 distributed thereupon for receiving crystal 24. Mounting flange 58 includes one or more mounting recesses 38 which are designed to receive fasteners 32 therethrough. Mounting recesses 38 are preferably elongated to permit instrument 17 to be slightly rotated before fasteners 32 are tightened and mounting flange 58 is firmly pressed against dashboard 30, which may be desirable to make the visual orientation of instrument 17 more aesthetically pleasing with respect to dashboard 30. Connector port 40 preferably extends from ventral surface 54 and is adapted to receive a connector plug, the combination of which provides a means of communication between circuit assembly 14 and a processing unit (not shown) to permit the exchange of electrical signals therebetween. A desiccant recess 42 in ventral surface 54 houses desiccant canister 19. Housing 15 preferably has one or more internal housing keys 50 which dictate the orientation of circuit assembly 14, light pipe 16, mask 20, and dial graphic 18 with respect to housing 15 to prevent relative rotation. A light pipe ridge 44 is located within internal housing key 50 to position the depth of light pipe 16 with respect to ventral surface 54 and dorsal edge 60. Similarly, a circuit assembly ridge 46 is likewise positioned within internal housing key 50 to position the depth of circuit assembly 14 with respect to ventral surface 54 and dorsal edge 60.

Continuing with FIG. 4, the external features of housing 15 include a bezel removal key 48 preferably positioned along dorsal edge 60 to facilitate the removal of bezel 26 from instrument 17. One or more external housing keys 52 are positioned along dorsal edge 60 to orient bezel 26 with respect to instrument 17 such that bezel 26 will not rotate. One or more snap edges 62 are preferably positioned on mounting flange 58 for snap-fitting bezel 26 to housing 15.

Figure 5:
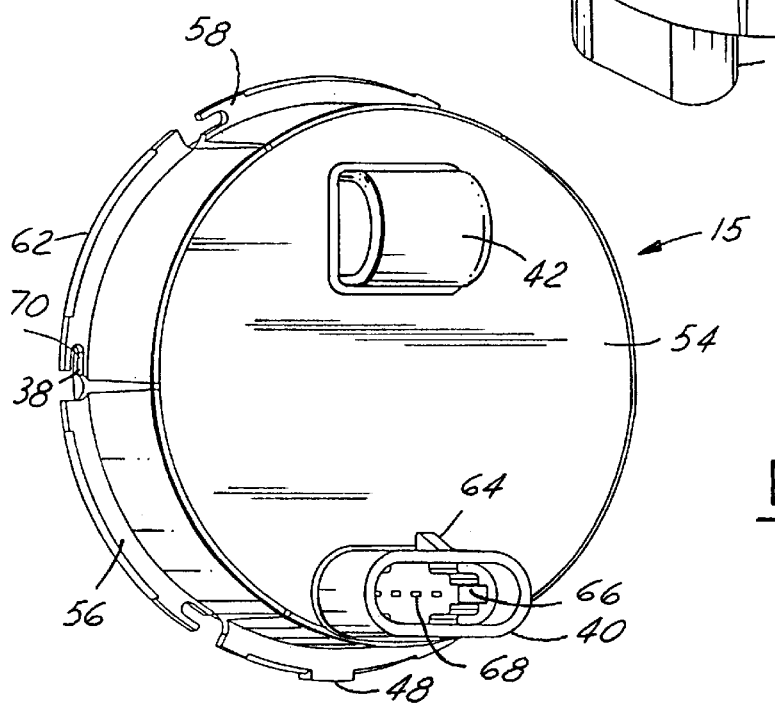
FIG. 5 is a simplified back view of the instrument housing.

Turning now to FIG. 5, external features of housing 15 are further detailed in a view from a bottom and side angle. Desiccant recess 42 appears as an extension or bump on ventral surface 54. Connector port 40 preferably includes a connector catch 64 for orienting a mating connector (not shown) with respect to housing 15 and retaining the mating connector within connector port 40. Connector port 40 preferably contains molded walls 66 which conform to mating connector (not shown) and assist in orienting the mating connector to connector port 40. Within connector port 40 are one or more connector pins 68 which are conductive and preferably integrally molded into housing 15. Lateral surface 56 includes one or more fastener recesses 70 which correspond to each mounting recess 38.

Figure 6:
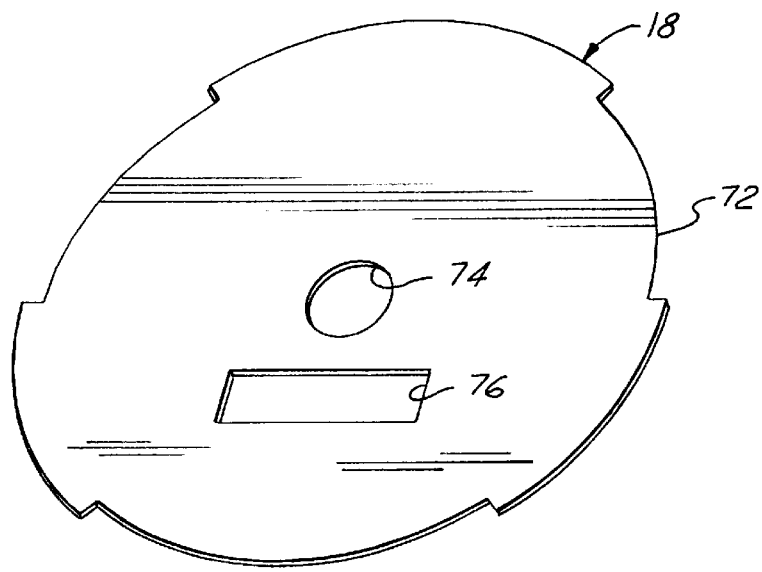
FIG. 6 is a simplified isometric view of the dial graphic.
Figure 11:
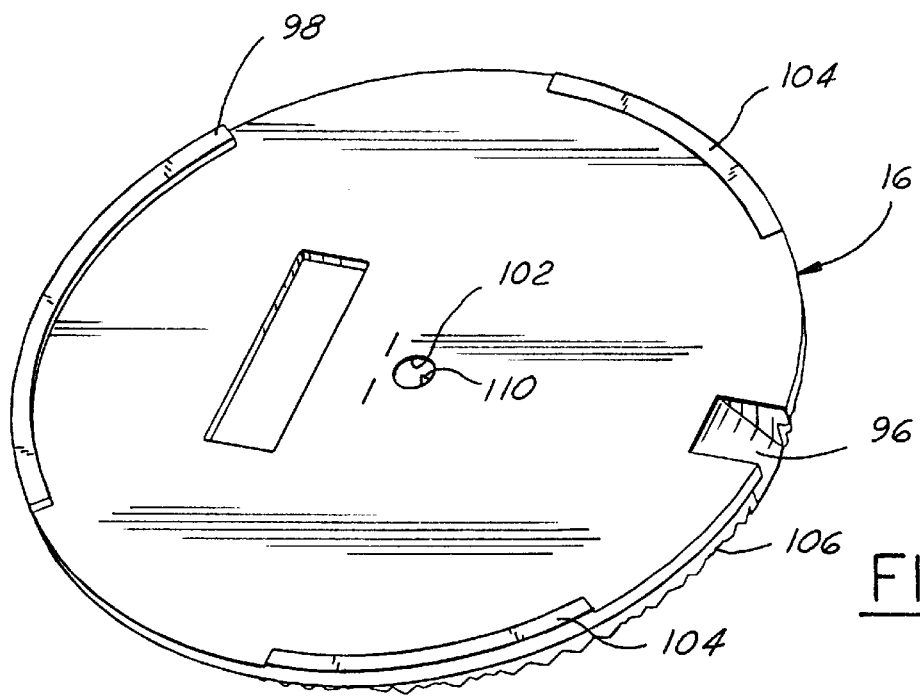
FIG. 11 is a simplified top view of the light pipe.

Turning now to FIG. 6, dial graphic 18 is viewed from the top and preferably includes one or more graphic notches 72 for aligning dial graphic 18 with light pipe 16 by means pipe ridge 98 and pipe locator 104 (See FIG. 11). Dial graphic 18 preferably includes a pointer hole 74 through which pointer 22 is attached to circuit assembly 14. Dial graphic 18 may optionally include a secondary instrument hole 76 to permit viewing of a secondary instrument, such as, for example, an hour meter or an odometer. Dial graphic 18 is preferably adhesive backed using conventional adhesives to stick to light pipe 16.

Figure 7:
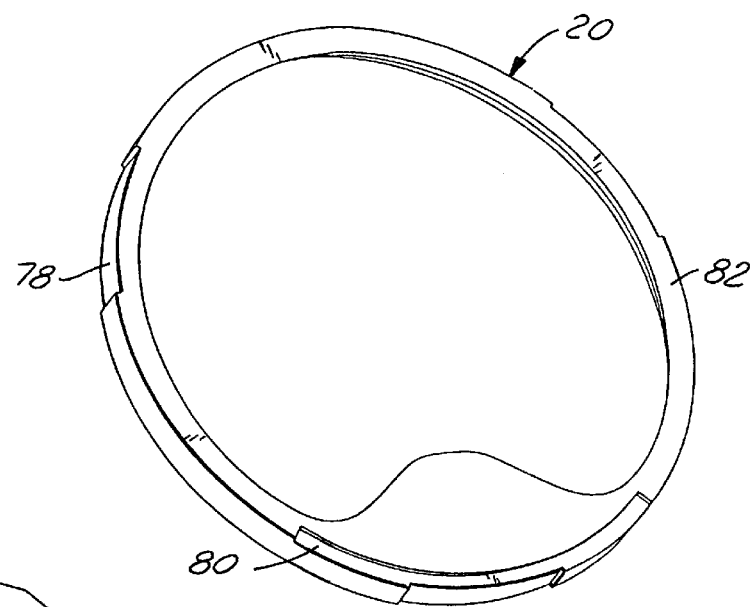
FIG. 7 is a simplified isometric view of the mask.

Now turning to FIG. 7, mask 20 is viewed from below, which is the side adjacent dial graphic 18. Mask 20 includes one or more mask notches 78 for aligning mask 20 with pipe ridge 98 of light pipe 16. Mask 20 also preferably includes a pipe shelf 80 for aligning mask 20 with light pipe 16 by engaging with pipe ridge 98. A mask rim 82 hides the edges of dial graphic 18 and maintains the depth of dial graphic 18 within housing 15. The mask 20 may be included in any number of different styles and shapes to accommodate the surrounding aesthetics of the vehicle.

Figure 8:
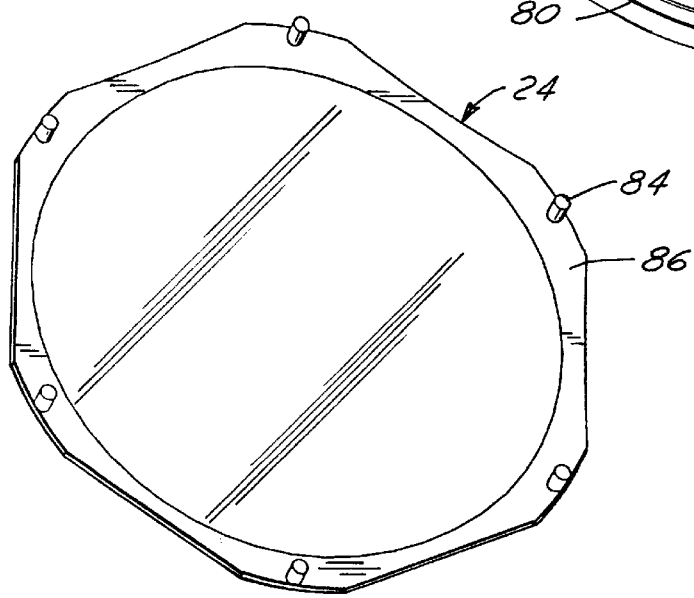
FIG. 8 is a simplified bottom view of the crystal.

FIG. 8 shows crystal 24 as viewed from below, which is the side adjacent mask 20. Crystal 24 preferably has one or more crystal legs 84 which fit into crystal locating dimples 36 (FIG. 4) of housing 15 to align crystal 24 with housing 15. A crystal rim 86 fits flush against dorsal edge 60 to which it is preferably ultrasonically welded to provide a seal for housing 15.

Figure 9:
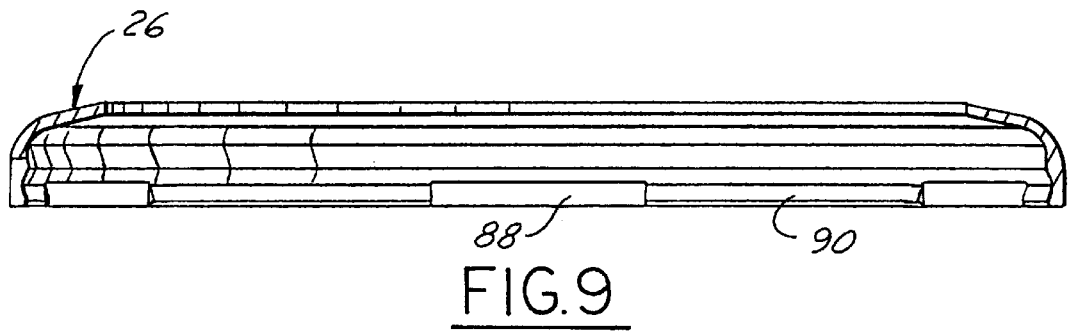
FIG. 9 is a simplified side view of the bezel.

Turning now to FIG. 9, bezel 26 is shown in cross section to illustrate snap-fit features. One or more snapping blocks 90 engage with corresponding snap edges 62 of housing 15 to fasten bezel 26 to housing 15. Snapping recesses 88 are interspersed between snapping blocks 90. Snapping blocks 90 on either side of bezel key hole 94 engage bezel removal key 48 to prevent rotation of bezel 26 with respect to housing 15.

Figure 10:
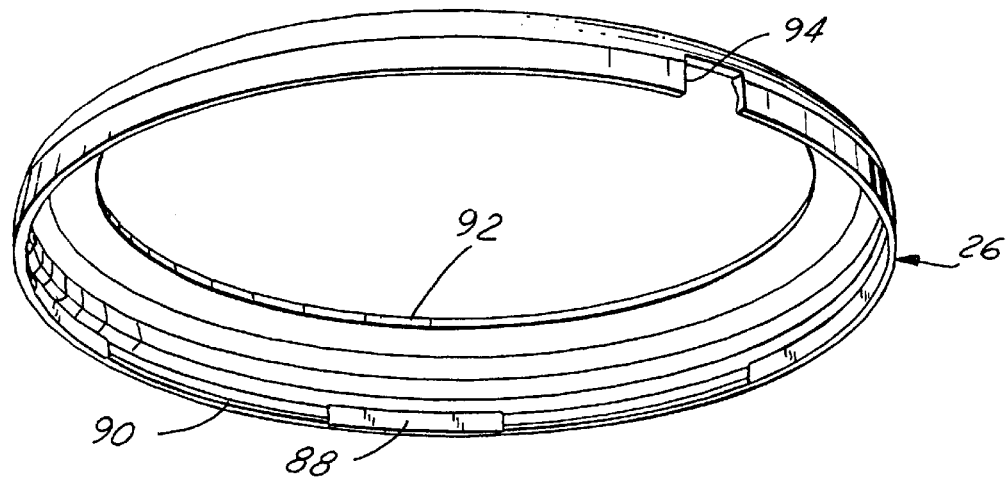
FIG. 10 is a simplified isometric view of the bezel.

FIG. 10 shows bezel 26 as viewed from below, which is the side adjacent crystal 24. Note that crystal 24 preferably is viewable through bezel hole 92. Also, note that while bezel 26 is preferable for hiding the front mounting of housing 17 with dashboard 30, housing 17 could also be mounted from the rear of dashboard 30 to render crystal 24 approximately flush with dashboard 30, without making use of bezel 26, if this appearance is deemed preferable. Bezel key hole 94 and bezel removal key 48 in housing cooperate to facilitate removal of bezel 26 from dashboard 30.

Turning now to FIG. 11, light pipe 16 as viewed from the top preferably includes a light pickup reflective surface 96 which reflects light from a light source (not shown) into the inner regions of light pipe 16. Light pipe also includes a pipe ridge 98 for engaging pipe shelf 80 of mask 20 as detailed in FIG. 7. Continuing with FIG. 11, light pipe 16 also may include an optional secondary instrument opening 100, such as for an odometer or hour meter, if this is desirable. A pipe pointer pickup 102 permits passage for pointer 22 to be attached to circuit assembly 14, and preferably includes one or more pointer reflective surfaces 110, which are shown and detailed in FIG. 13. Continuing with FIG. 11, one or more pipe locators 104 are preferably included to mate with light pipe ridges 44 in housing 15 to maintain the vertical relationship between light pipe 16 and housing 15. Pipe locators 104 may also be keyed to maintain the rotational relation of light pipe 16 with housing 15. Underside of light pipe 16 preferably includes one or more light spreading prisms 106, which are detailed in FIG. 12.

Figure 12:
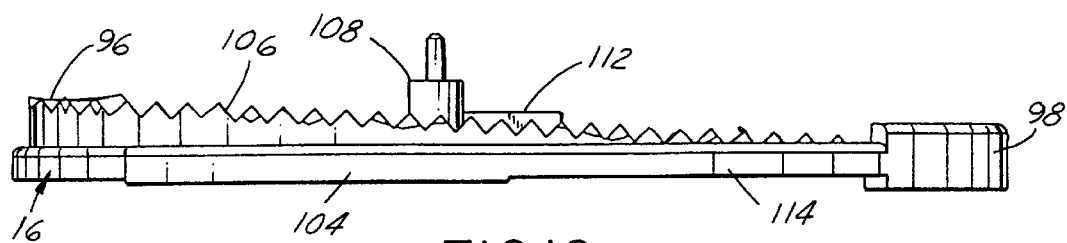
FIG. 12 is a simplified side view of the light pipe.

FIG. 12 shows a side view of light pipe 16, which is preferably of wedge-shaped cross-section for optimum spreading of light, with the thickest part of the wedge near a light pickup reflective surface 96. The use of a light emitting diode as the light source instead of an incandescent bulb makes the light source virtually maintenance-free. Light pickup reflective surface 96 is preferably positioned directly over a light source, such as a light emitting diode (not shown), which is fixedly mounted to circuit assembly 14. Light spreading prisms 106 preferably substantially cover the side of light pipe 16 adjacent circuit assembly 14 for reflecting light throughout light pipe 16. In the preferred embodiment, light spreading prisms 106 are pyramid-shaped prisms. Light pipe 16 also preferably includes one or more locating posts 108 which permit light pipe 16 to be placed in a plane parallel to circuit assembly 14 with respect to a dorsal light pipe surface 114. A pointer reflection area 112 is also preferably included on light pipe 16 for concentrating light into one or more pointer reflective surfaces 110, which are shown in FIG. 13.

Figure 13:
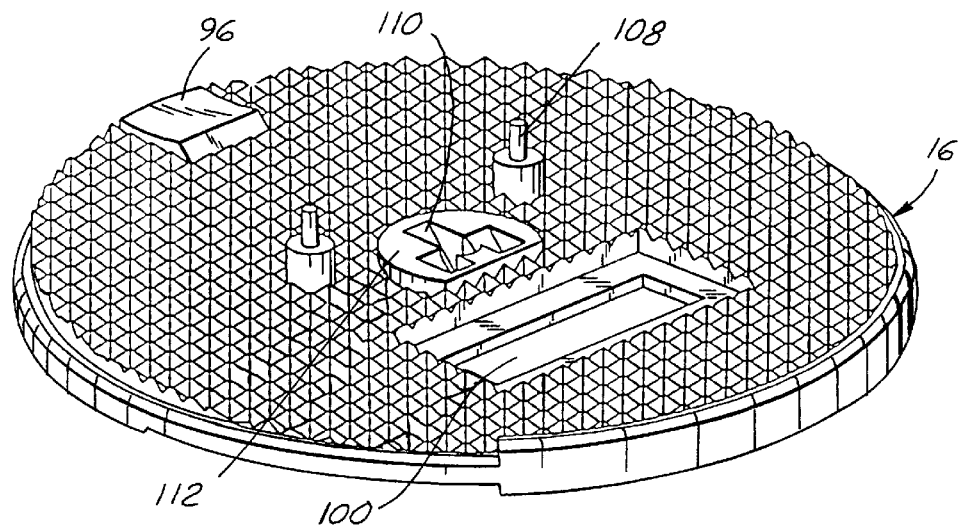
FIG. 13 is a simplified isometric view of the light pipe.

FIG. 13 shows light pipe 16 from a side adjacent circuit assembly 14, with light pipe locating posts 108 extending therefrom. Light pickup reflective surface 96 is preferably rectangular and slightly curved to facilitate pickup of light from a light source with a narrow viewing angle (not shown). Pointer reflection area 112 includes one or more pointer reflective surfaces 110 which channel light from light pipe 16 into pointer 22 to provide pointer 22 with illumination. Pointer 22 is preferably made of polycarbonate, which light pipe 16 is preferably made of acrylic.

In operation, light is emitted from the light source and directed to light pickup reflective surface 96, which, due to its curved profile, scatters light rays throughout the light pipe 16 in all directions. The light scattering prisms 106 help spread the light throughout the light pipe 16 by scattering the light rays. The wedge shape of the light pipe 16 helps to maintain the light rays inside of the light pipe 16 instead of allowing them to escape from the sides thereof, as would happen if the dorsal light pipe surface 114 and the side of light pipe 16 adjacent circuit assembly 14 were parallel. This combination of elements evenly lights the face of dial graphic 18. Finally, pointer reflective surfaces 110 are angled appropriately so as to receive light rays from the light pipe 16 and reflect them into the pointer 22, thereby illuminating the pointer 22.

The preceding description is exemplary rather than limiting in nature. A preferred embodiment of this invention has been disclosed to enable one skilled in the art to practice this invention. Variations and modifications are possible without departing from the spirit and purview of this invention, the scope of which is limited only by the appended claims.

I claim:

1. An evenly-lit instrument assembly adapted to be front-mounted in an opening in a vehicle's dashboard, said dashboard having a front side and a back side, comprising:

a housing having a lateral surface which defines a space inside said housing,
said lateral surface having a dorsal edge;

a flange fixedly attached to said housing for mounting said housing in said opening of said dashboard, said
flange having a plurality of recesses adapted to slidably receive a fastener therethrough, said fastener being adapted to engage said front side of said dashboard, and said flange being fully accessible from said front side of said dashboard;

a circuit assembly fitted within and secured inside of said housing and adapted for providing an electrical signal to a pointer in communication therewith;

a dial fitted within and secured inside said housing and above said circuit assembly for providing visual reference measurement points to which said pointer may point; and a bezel which is adapted to fixedly attach to said mounting flange of said housing.

2. The assembly in claim 1, wherein:
said housing further comprises a snap edge; and
said bezel comprises a snapping recess adapted to engage said snap edge.

3. The assembly in claim 1, further comprising a crystal secured to said housing by an ultrasonic weld between said crystal and said housing.

4. The assembly in claim 1, further comprising:
a light pipe, having a light-receiving side, a light-emitting side and a cross-section, fitted inside said housing, above said circuit assembly and below said dial,
wherein said dial includes a translucent material; and
wherein said circuit assembly further comprises a light source positioned directly below said light pipe.

5. The assembly in claim 4, wherein said light source is a light-emitting diode.

6. The assembly in claim 4, wherein said light pipe comprises:
a light pickup reflective surface located on said light-receiving side and positioned over said light source.

7. The assembly in claim 6, further comprising one or more pointer reflective surfaces adapted to channel light from said light-emitting side of said light pipe to said pointer.

8. The assembly in claim 4, further comprising a mask fitted in said housing located above said dial and below a crystal secured to said housing.

9. The assembly in claim 3, further comprising:

internal housing keys for rotatably fixing said light pipe, said mask, and said dial relative to said housing.

10. The assembly in claim 9 wherein at least one of said internal housing keys is attached to said inner wall of said housing and at least one dial notch is formed in said dial for fitting together with said light pipe and at least one mask notch is formed in said mask for fitting with a ridge in said light pipe.

11. A lighted instrument assembly adapted to be mounted in a dashboard, comprising:

a housing having a lateral surface which defines a space inside said housing, said housing having a mounting flange extending radially away from said lateral surface, said mounting flange having a plurality of mounting recesses; and a circuit assembly disposed inside of said housing; and a light source disposed on a first side of said circuit assembly; and a pointer that is mounted to said circuit assembly; and a dial graphic disposed inside of said housing on said first side of said circuit assembly, said dial graphic providing visual reference measurement points to which said pointer points; and a crystal disposed at a first end of said housing and on a side of said dial graphic opposite said circuit assembly, wherein said mounting flange serves as a mounting feature and said crystal aids in retaining said circuit assembly and said dial graphic within said housing.

12. The instrument assembly of claim 11, further comprising:

a light pipe that is disposed between said circuit assembly and said dial graphic, said light pipe having a light pickup reflective surface substantially aligned with said light source, a pointer reflective surface, and an inner region connecting said light pickup reflective surface and said pointer reflective surface, wherein light impinging on said light pickup reflective surface is reflected to said pointer reflective surface.

13. The instrument of claim 11, further comprising:

a mask that is disposed between said dial graphic and said crystal, wherein said mask covers an edge of said dial graphic.

14. The instrument assembly of claim 11, further comprising:

a bezel which is fixed to the first end of said housing and engagement with said mounting flange, said bezel covers a dorsal edge of said housing.

15. A lighted instrument assembly adapted to be mounted in a dashboard, comprising:

a housing having a lateral surface which defines a space inside said housing, said housing having a mounting flange extending radially away from said lateral surface, said mounting flange having a plurality of mounting recesses; and a circuit assembly disposed inside of said housing; and a light source disposed on a first side of said circuit assembly; and a pointer that is mounted to said circuit assembly; and a dial graphic disposed inside of said housing on said first side of said circuit assembly, said dial graphic providing visual reference measurement points to which said pointer points; and a crystal disposed at a first end of said housing and on a side of said dial graphic opposite said circuit assembly; and a light pipe that is disposed between said circuit assembly and said dial graphic, said light pipe having a light pickup reflective surface substantially aligned with said light source, a pointer reflective surface, and an inner region connecting said light pickup reflective surface and said pointer reflective surface, wherein light impinging on said light pickup reflective surface is reflected to said pointer reflective surface; and a mask that is disposed between said dial graphic and said crystal; and a bezel which is fixed to the first end of said housing and engagement with said mounting flange, said bezel covers a dorsal edge of said housing.

16. A lighted instrument assembly adapted to be mounted in a dashboard said dashboard having a front and rear side, said lighted instrument assembly comprising:

a housing having a lateral surface which defines a space inside said housing, said housing having a mounting flange extending radially away from said lateral surface said flange being fully accessible from said front side of said dashboard, said mounting flange receiving a fastener therethrough, said fastener being adapted to engage said front side of said dashboard; and a circuit assembly disposed inside of said housing and secured therein; and a light source disposed on a first side of said circuit assembly; and a pointer that is mounted to said circuit assembly; and a dial graphic disposed inside of said housing on said first side of said circuit assembly, said dial graphic providing visual reference measurement points to which said pointer points; and a bezel which is adapted to fixedly attach to said mounting flange of said housing, concealing said fasteners.

* * * * *

UNITED STATES PATENT AND TRADEMARK OFFICE
CERTIFICATE OF CORRECTION

PATENT NO. : 5,971,558
DATED : October 26, 1999
INVENTOR(S) : Ronald Brian Peel

It is certified that error appears in the above-identified patent and that said Letters Patent is hereby corrected as shown below:

Column 7, line 4, delete "3" and insert --8--.

Signed and Sealed this

Sixteenth Day of May, 2000

Attest:

Q. TODD DICKINSON

*Attesting Officer*     *Director of Patents and Trademarks*